(12) United States Patent
Luthi et al.

(10) Patent No.: US 8,446,051 B2
(45) Date of Patent: May 21, 2013

(54) POWER SUPPLY UNIT HAVING A VOLTAGE CONVERTER

(75) Inventors: Daniel Luthi, Winterthur (CH); Jean-Noel Divoux, La Chaux-de-Fonds (CH); Steffen Schmid, Reutlingen (DE); Siegfried Kern, Freiamt (DE)

(73) Assignee: EM Microelectronic-Marin S.A., Marin (CH)

( * ) Notice: Subject to any disclaimer, the term of this patent is extended or adjusted under 35 U.S.C. 154(b) by 0 days.

(21) Appl. No.: 13/396,926

(22) Filed: Feb. 15, 2012

(65) Prior Publication Data

US 2012/0163054 A1 Jun. 28, 2012

Related U.S. Application Data

(63) Continuation of application No. 12/491,623, filed on Jun. 25, 2009.

(30) Foreign Application Priority Data

Jul. 11, 2008 (EP) .................................... 08160279

(51) Int. Cl.
*H01H 47/00* (2006.01)

(52) U.S. Cl.
USPC ............ 307/130; 700/296; 713/340; 713/300

(58) Field of Classification Search
USPC .................. 700/296; 713/340, 300; 323/322, 323/323; 307/130
See application file for complete search history.

(56) References Cited

U.S. PATENT DOCUMENTS

| 5,450,003 | A | 9/1995 | Cheon |
| 5,459,652 | A | 10/1995 | Faulk |
| 5,999,421 | A * | 12/1999 | Liu ............................ 363/21.15 |
| 6,088,243 | A | 7/2000 | Shin |
| 6,184,651 | B1 | 2/2001 | Fernandez et al. |
| 6,987,677 | B2 | 1/2006 | Konno |
| 7,570,209 | B2 | 8/2009 | Shi et al. |
| 2002/0012258 | A1 | 1/2002 | Nagai et al. |
| 2003/0117813 | A1 | 6/2003 | Hong et al. |
| 2006/0098462 | A1 | 5/2006 | Usui |

FOREIGN PATENT DOCUMENTS

| EP | 0 942 518 A2 | 9/1999 |
| EP | 1 819 032 A1 | 8/2007 |
| WO | 2006/011032 A1 | 2/2006 |

OTHER PUBLICATIONS

International Search Report issued in corresponding International Application PCT/EP2009/057486, completed Feb. 16, 2010 and mailed Feb. 24, 2010.

* cited by examiner

*Primary Examiner* — Shawn Riley
(74) *Attorney, Agent, or Firm* — Griffin & Szipl, P.C.

(57) ABSTRACT

The present invention concerns an electrical installation or device equipped with a power supply unit comprising a voltage converter having primary and secondary parts respectively defining a primary side and a secondary side of this electrical installation or device. This power supply unit comprises a power management unit arranged on the primary side, the primary part of the converter being associated with a control circuit also arranged on the primary side and controlling the electrical energy flowing in the primary power path of the primary part. The control circuit receives from the power management unit at least a first control signal for switching OFF the electrical energy in the primary power path, the power supply unit entering a very low power mode ("Powerdown" mode) when the first control signal is set to OFF so that the converter is not supplied anymore. The power management unit is arranged such that, in the very low power mode, it can receive or generate at least a wake-up signal and set to ON the first control signal in response to the wake-up signal for supplying again the primary and secondary parts of the converter.

20 Claims, 9 Drawing Sheets

POWER SUPPLY UNIT HAVING A VOLTAGE CONVERTER

This application is a Continuation of U.S. Ser. No. 12/491,623, filed Jun. 25, 2009, which claims priority from European Patent Application No. 08160279.9, filed Jul. 11, 2008, the entire disclosures of which is incorporated herein by reference.

FIELD OF THE INVENTION

The invention concerns an electrical installation, device or system having a power supply equipped with a voltage converter or transformer and having a mode with substantially reduced power consumption (Stand-by mode).

The present invention introduces a new "Stand-by" mode, called "Power-down" mode, which has very low power consumption, while preserving system wake-up functionality.

The invention may be used in broad range of consumer electronics devices, in computers (in particular desktop PC), displays or computer screens, TV sets, DVD players and High-Fidelity sets (Hi-Fi), in docking stations or base stations e.g. for wireless phones and answering machines, in decoders or demodulators (Set-Top Box), readers and receivers, in electrical ovens or induction stoves, kitchen ventilations and refrigerators, in home appliances and home automation products (gate entry, garage door openers, automatic interior blinds or roller shutters), in entertainment devices like electronic play stations, in sensor devices, in security systems, etc.

BACKGROUND OF THE INVENTION

Cumulative stand-by power consumption of different electrical devices in homes and in industry is huge. Thus, there is a large energy savings potential by reducing this electrical consumption to the lowest level. For example a DVD player or a Set-Top Box generally consumes 1 to 4 Watts in its Stand-by mode, resulting in an annual energy consumption of 8 to 30 kWh.

In known electrical installations or devices equipped with a voltage converter and having a stand-by mode, the main problem relative to the power consumption in the stand-by mode are due to the fact that the converter remains powered in this stand-by mode, i.e. that the secondary side of this converter is still supplied by the primary side. Thus, the secondary supply lines are still active as power sources for the several elements and units on the secondary side of the installation or device.

Even if a power management unit is arranged on the secondary side to switch OFF some units and/or to put some units into a low energy consumption mode, in particular a main CPU (Central Processing Unit), the converter is ON and the energy losses of this converter are continuously present in the stand-by mode. Furthermore, some units or elements on the secondary side continue to consume energy in the stand-by mode because they are powered.

SUMMARY OF THE INVENTION

A first object of the present invention is to propose a new concept and corresponding system architecture for the power management of electrical installations or devices equipped with a voltage converter or transformer and having a "power-down" mode in which the electrical energy consumption is very low.

A further object of the invention is to propose an efficient power management of the secondary side of such installations or devices in different functional modes involving a novel primary side power control concept.

The general architecture of the power supply system or unit of the present invention for an electrical installation or device is shown in FIG. 1. The system power management according to the invention shown in this FIG. 1 overcomes known drawbacks of current installations or devices.

The power supply unit comprises a converter or transformer with a primary part and a secondary part having several output lines at different voltage levels (e.g. 3 V, 5 V, 12 V, 24 V). The converter defines a primary side and a secondary side of the installation or device. The primary part is associated with a control circuit for managing the electrical energy flowing in the primary power path of the converter and a system power management unit is arranged on the primary side for supplying the control circuit and for providing the necessary control signal(s) to this control circuit. The control circuit handles a key switching function of the primary power supply of the converter. Thus, as a function of the control signal given by the power management unit or circuit, the power supply to the secondary part of the converter can be turned OFF or ON. Further, in an active mode, the efficiency of the converter can be increased by providing a pulse width modulated signal (PWM signal) to the control unit of the electrical current flowing through the primary part of the converter.

The system power management unit or circuit according to the invention receives its power supply from an input circuit electrically connected to an external power source, in particular the mains. This system power management unit or circuit is arranged for adapting or reducing the voltage of the mains to an appropriate voltage level for supplying the control circuit associated to the primary part of the converter and for the supply of its own electronic unit(s) and/or electrical elements.

In Power-down mode, this system power management unit or circuit is able to receive an external and/or internal control signal (wake-up signal) and/or a system control signal (in case the installation or device is connected to a system or network) and/or a switch to resume from power-down mode and to activate the installation or parts thereof (i.e. to supply power to at least portions of the secondary part of the converter and thus at least partially to the electronic units and electrical elements on the secondary side of the installation).

Examples of external control signals include, but are not limited to:
  Infra-red (IR) remote control;
  Sensors (external temperature, pressure, magnetic field, light, etc);
  RF signal.

Examples of system control signals include, but are not limited to:
  Computer signal;
  Home network generated signal.

Examples of internal control signals include, but are not limited to:
  Time base (e.g. programmable timer);
  Sensors (internal temperature, pressure, magnetic, etc).

In a particular embodiment, it is possible to have sensor(s) and/or LED(s) and/or a display on the primary side supplied and controlled through the system power management unit. It is also possible to have a time base used to display the time and/or for wake up from power-down mode and/or for programming purposes.

Thus, the invention concerns an electrical installation or device equipped with a power supply unit comprising a voltage converter having primary and secondary parts respectively defining a primary side and a secondary side of this electrical installation or device, wherein said power supply unit comprises a power management unit arranged on said primary side, the primary part of the converter being associated with a control circuit also arranged on said primary side and controlling the electrical energy flowing in the primary power path of said primary part, this control circuit receiving from the power management unit at least a first control signal for switching OFF the electrical energy in said primary power path, said power supply unit entering a very low power mode ("Power-down" mode or Lowest Power mode) when said first control signal is set to OFF so that the converter is not supplied anymore, said power management unit being arranged such that, in said very low power mode, it can receive or generate at least a wake-up signal and set to ON said first control signal in response to said wake-up signal for supplying again said primary and secondary parts of the converter.

According to a particular feature of the invention, the electrical installation or device is further characterized in that the power management unit is arranged for adapting or reducing the Input Voltage received by an input circuit of said power supply unit to at least a lower voltage level for supplying its electronic elements. According to another particular feature of the invention, the power management unit is further arranged for supplying said lower voltage to the control circuit associated with said converter.

According to a preferred variant of the invention, the power management unit comprises a power supply controller managing several functions of this power management circuit, a first voltage reducer providing an Intermediate Voltage when receiving an Input Voltage and a second voltage reducer following said first voltage reducer and providing a Low Voltage for supplying said power supply controller. According to a particular feature of the invention, said Intermediate Voltage is used to supply said control circuit.

According to another preferred variant of the invention, the power management unit is associated with an external control interface, a sensor, a receiver and/or a switch arranged on said primary side for receiving at least a first external control defining a wake-up signal to transition from low power mode into active mode. In an alternative implementation of the invention, the power management unit is associated with a time base, this time base being active in said very low power mode, said power management unit being arranged for measuring a determined time period after which said wake-up signal is generated.

According to another preferred variant of the invention, the power management unit is arranged for providing a second control signal to said control circuit of said primary part of said converter, this second control signal defining a PWM signal for regulating the electrical energy flowing through said primary path in at least another functional mode other than said very low power mode and thus the electrical power supplied to said secondary side of the electrical installation or device.

According to further particular features of the invention, said power supply unit further comprises a high voltage storage capacitor connected to a high voltage supply line receiving a rectified Input Voltage, and a low or intermediate voltage storage capacitor connected to an intermediate voltage supply line to which the output of said first voltage reducer and the input of said second reducer are connected.

According to another preferred variant of the invention, said power management unit further comprises a start-up supply circuit arranged between said high voltage supply line and said intermediate voltage supply line, this start-up supply circuit being arranged to supply said low voltage storage capacitor in a start-up mode.

According to another preferred variant of the invention, the power management unit further comprises a discharge circuit for discharging said high voltage storage capacitor after a certain delay when said Input Voltage is switched OFF.

According to another preferred variant of the invention, a bi-directional insulated interface is arranged between the primary side and the secondary side for data transfer between said power supply controller located on the primary side and at least a main controller located on the secondary side of the electrical installation or device.

According to another preferred variant of the invention, said first voltage reducer defines a bridge rectifier together with a capacitive divider, this first voltage reducer having very low power consumption. In a particularly advantageous variant, the first voltage reducer is formed by a circuit having only two double-diodes, one Zener diode and entry resistor(s) and capacitor(s).

According to another preferred variant of the invention, said second voltage reducer has a very low power consumption and is formed by a circuit having a low current Zener diode, a resistor arranged in series with the Zener diode and, in parallel to these two elements, a transistor arranged in series with a capacitor providing the low voltage, the base of the transistor being connected between the resistor and the Zener diode.

According to another preferred variant of the invention, the electrical installation or device further comprises a feedback signal generated by a coil in parallel to said first voltage reducer in order to supply the primary side of the power supply unit when said converter is powered.

According to another preferred variant of the invention, the control circuit associated with the converter comprises a switching circuit for turning OFF or ON the supply of said control circuit in order to switch OFF or ON the energy supply in said primary part of the controller.

According to another preferred variant of the invention, said power supply unit comprises an input circuit with a rectifier, said input circuit having at least a first capacitor on the AC side and at least a second capacitor on the DC side of the rectifier, said first capacitor having a maximum value selected so that no parallel resistor is needed within said Input Circuit.

According to another preferred variant of the invention, the electrical installation or device can keep the current state of this electrical installation or device in said power management unit when the input supply is cut OFF without any additional battery or big capacitor (Supercap/Goldcap).

In FIG. 2, a preferred general embodiment of the present invention is shown. The mains input is connected to the Input circuit having typically a fuse, a filter and a rectifier. This Input circuit receives the high voltage (typically 100 to 250 Volts) of the mains. Its output is electrically linked to the primary part of a DC/DC voltage converter. This primary part is associated with a control circuit as already mentioned. The system power management unit has a first voltage reducer/adapter providing on the primary side an intermediate voltage (e.g. 10 to 15 Volts). This intermediate voltage is used to supply the control circuit and also to supply a second voltage reducer/adapter which provides a low voltage (e.g. 3 to 5 Volts). It is to be noted that the first voltage reducer receives in a first variant a VAC supply signal from the input circuit, i.e. a non rectified supply signal, and in a second variant a VDC supply signal, i.e. a supply signal which has being rectified by the rectifier of the input circuit.

The second voltage reducer supplies a power supply controller and an external control interface which receives an external control signal. According to the present invention, this power supply controller is arranged to provide different control signals as a function of external control signal(s) and/or internal control signal(s). An ON/OFF signal is provided to the control circuit by the power supply controller. For putting the installation in the power-down mode ("zero power" mode), the power supply controller sends an OFF signal to the control circuit which switches OFF the flow of the electrical current in the primary path of the DC/DC converter and thus the supply of the secondary part of this converter by the primary part. By receiving a wake-up signal in particular via the external control interface, the power supply controller sends an ON Signal to the control circuit which switches ON the flow of electrical current in said primary path so as to at least partially supply the secondary part of the converter by the primary part.

In order to manage the supply of the secondary supply lines in an optimal way for each mode of operation of the installation/device, the power supply controller is arranged to provide a PWM signal to the control circuit of the primary part of the converter. Based on this PWM signal, it is possible to precisely adapt the power supply by the primary part to the secondary part of the converter and thus to the diverse units and elements supplied by the secondary supply lines. As a consequence, the power supply controller can act on the primary part of the converter to adapt the power supply to the total load on the secondary side.

In a preferred variant, the power supply controller has also at least one output connected to a control or processing unit on the secondary side through an insulated data transfer circuit maintaining a galvanic separation between the primary and secondary sides. The power supply controller can thus send and/or receive at least one control signal to/from an electronic unit on the secondary side after having woken up the installation/system or device of the present invention. The power supply controller can also be associated with a time base arranged on the primary side of the installation or device.

It is to be noted that the first voltage reducer may be made only with discrete elements and does not need to provide a very accurate or stabilized voltage. To the contrary, the second voltage reducer could be formed by an electronic circuit providing an accurate voltage to the power supply controller and, if any, to a sensor or other electronic units. The control circuit may be made predominantly with discrete elements and supplied with the intermediate voltage. In a variant, this control circuit has an integrated unit supplied with a low voltage, e.g. the voltage provided by the second voltage reducer. The two voltage reducers may be replaced by a common voltage reducer unit having two or more voltage output levels. In a particular variant, only one voltage reducer providing a low voltage could be used.

The voltage reducer and associated circuits on the primary side are dimensioned for the supply of the small number of electrical elements and electronic units arranged on the primary side and associated with the system power management system. Thus, it is possible to reduce the electrical consumption of the installation in power-down mode to a minimum. In this power-down mode, the major part of the control circuit associated to the primary part of the converter may also be turned OFF and woken-up when receiving an ON signal from the power supply controller.

For the example of a Set-Top Box, it is possible to reduce the power consumption in the "power-down" mode or lowest power mode to below 10 mW while still operating an infra-red receiver or to below 5 mW when not using an infra-red receiver A further important advantage of the present invention is that there is no need to incorporate a battery or a gold capacitor (super capacitor) into the secondary part of the installation or device of the invention.

BRIEF DESCRIPTION OF THE DRAWINGS

The present invention will further be described in more details in the following description of a preferred embodiment with the help of the drawings, given as examples in a non-limiting way, in which.

DETAILED DESCRIPTION OF AN
ILLUSTRATIVE EMBODIMENT

Figure 1:
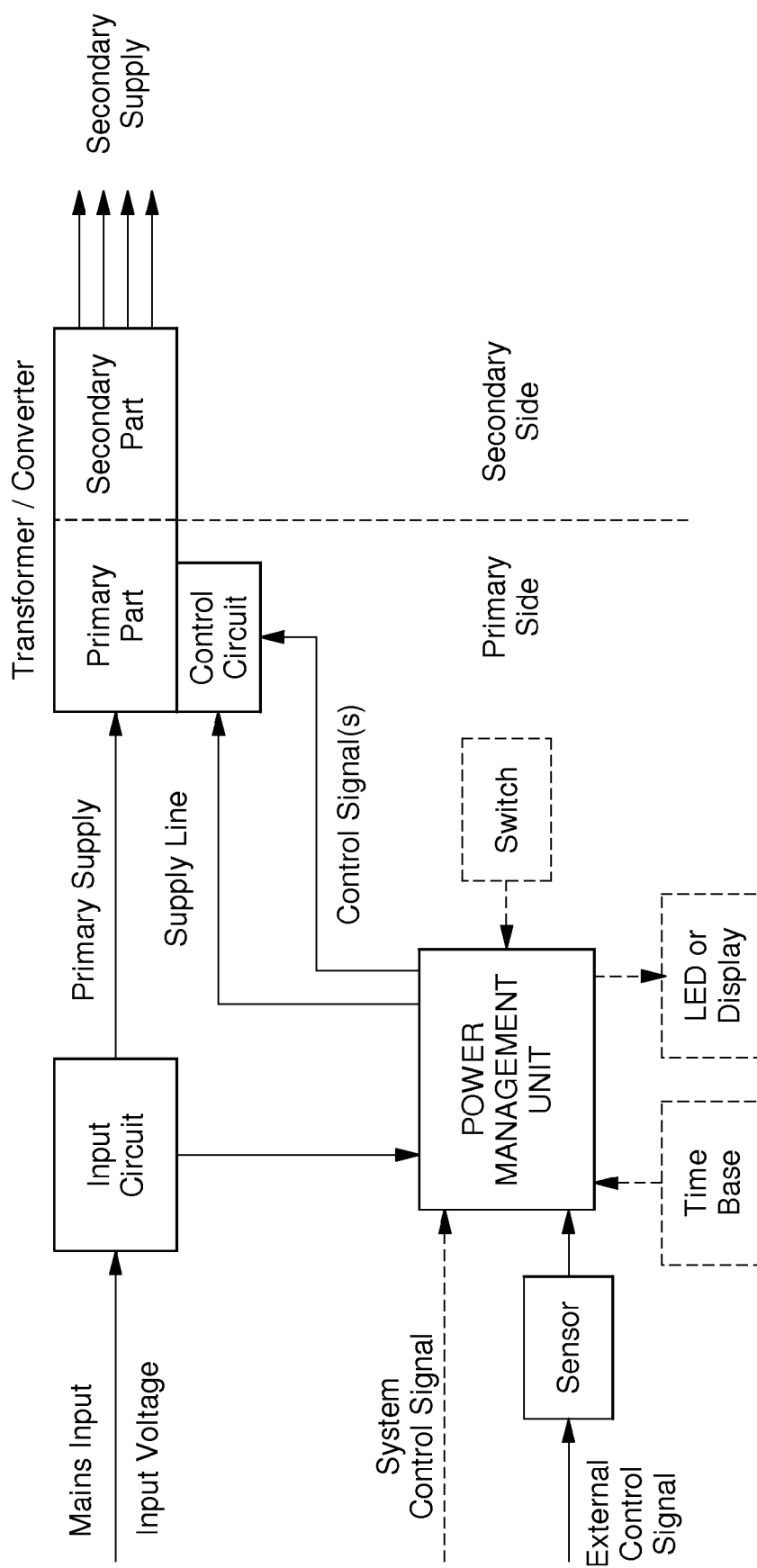
FIG. 1, already described, schematically shows the general architecture of a power supply system or unit according to the present invention.
Figure 2:
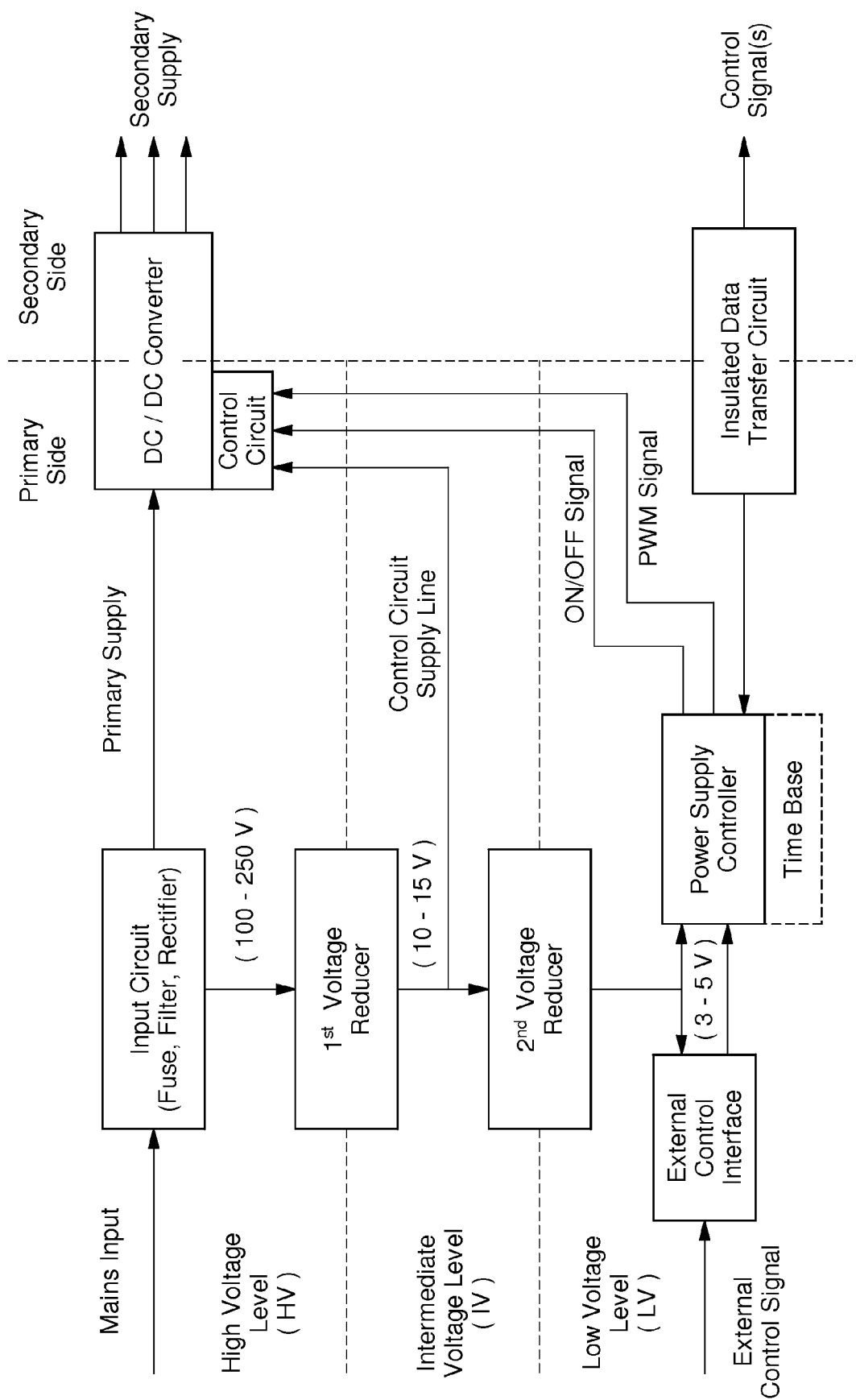
FIG. 2, already described, schematically shows a preferred general embodiment of the present invention.
Figure 3:
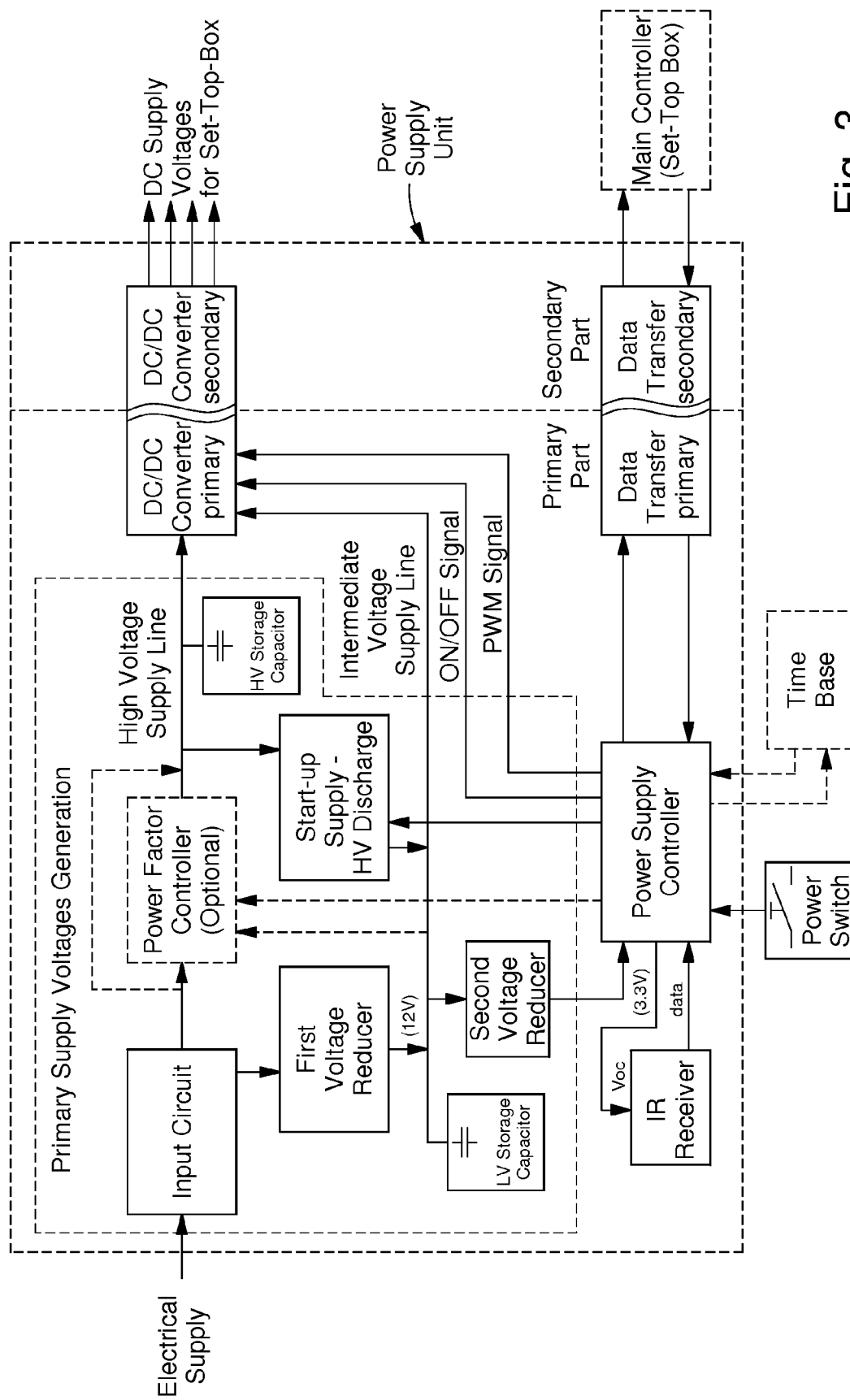
FIG. 3 is block diagram of a preferred power supply unit according to the present invention, given in a non-limiting way.

In the following description of the invention, a power supply unit for a Set-Top Box (STB device) will be described in detail. FIG. 3 shows the block diagram of this power supply unit. It should be noted that this is a specific implementation of the invention. The present invention applies broadly as outlined in the introductory section "Field of the invention".

In the particular embodiment described below, four operating modes are provided:

"Power-down" mode (lowest power mode, converter not powered, outputs not powered)
"Stand-by" mode (all secondary voltages available, but light load)
"Start-up" mode (Higher current available on 12V supply, e.g. hard drive start-up phase)
Active mode (full functionality, normal operation).

The power supply unit represented on FIG. 3 comprises a DC/DC voltage converter, having primary and secondary parts respectively defining a primary side and a secondary side of the electrical installation or device including this power supply unit, and on said primary side a Supply Voltages Generation and Control part, a Power Supply Controller, an IR Receiver and a HV Storage Capacitor. Furthermore the power supply unit comprises or is associated with an insulated Data Transfer circuit between primary and secondary sides of the electrical installation or device. The Supply Voltages Generation and Control part includes an Input Circuit, a First Voltage Reducer, and Low Voltage Capacitor (or Intermediate Voltage Capacitor), a Second Voltage Reducer and a Start-up Supply/Discharge Circuit. In the following, each block of the power supply unit of the particular embodiment of FIG. 3 will be described.

A) Primary Supply Voltages Generation

The preferred electronic circuits for the different elements of the primary supply voltages generation for supplying the electronic units arranged on the primary side according to the invention will be described.

Figure 4:
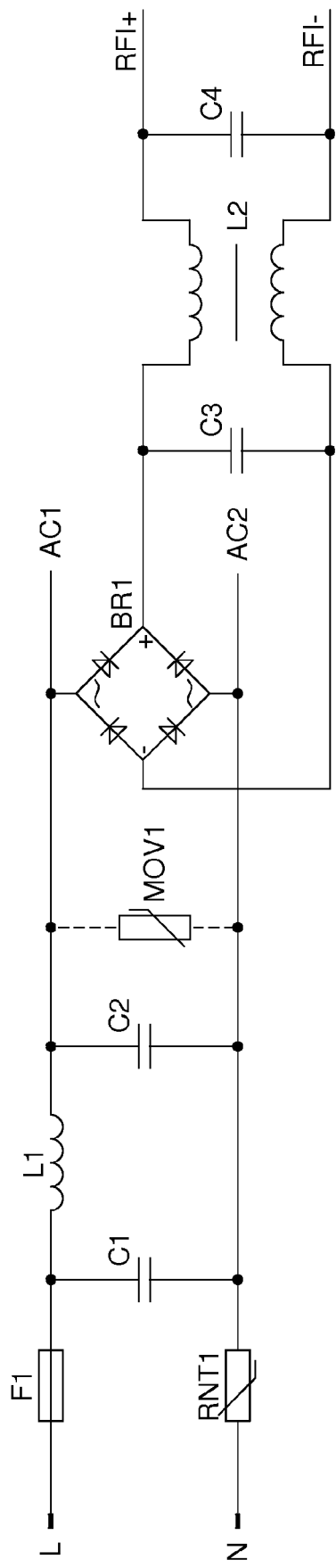
FIG. 4 shows the arrangement of the input circuit of the power supply unit of FIG. 3.

The Input Circuit is shown on FIG. 4.

"MOV1" is an optional varistor and can be used for improved transient immunity on the mains input. L1/C2 might be not necessary (depending on EMI measurement results).

For inrush current limitation at power level above ~30 W, usually an NTC is used (RNT1). A typical value for 50 W power is 10 R.

For "power-down" mode the normal "X"-capacitors on the AC side (C1, C2) have a certain maximum capacity. The usual safety standards specify a maximum of 100 nF—otherwise a parallel resistor is required to discharge these capacitors (danger of electrical shock after pulling mains plug). However, such a parallel resistor would result in a too high power loss already. To avoid the need of this parallel resistor, higher capacitances on the DC side (C3, C4) are used. In this case, the usual current compensated choke (L2) should also be on this DC side.

An HV Storage Capacitor is needed for primary side energy storage (e.g. during short line interrupts) and filtering the rectified AC input voltage to get an acceptable ripple voltage. This capacitor is arranged between the Input Circuit and the DC/DC Converter (see FIG. 3). Given the fact that the parallel resistor has been removed from the input circuit, a new discharge circuit has been introduced for discharging the HV Storage Capacitor. This discharge circuit will be described later.

With a typical value for output power of 50 W (230 VAC input without PFC), The HV Storage Capacitor has e.g. a value of 100 µF (min. 400 V). Such a capacitor has a very low leakage current.

Figure 5:
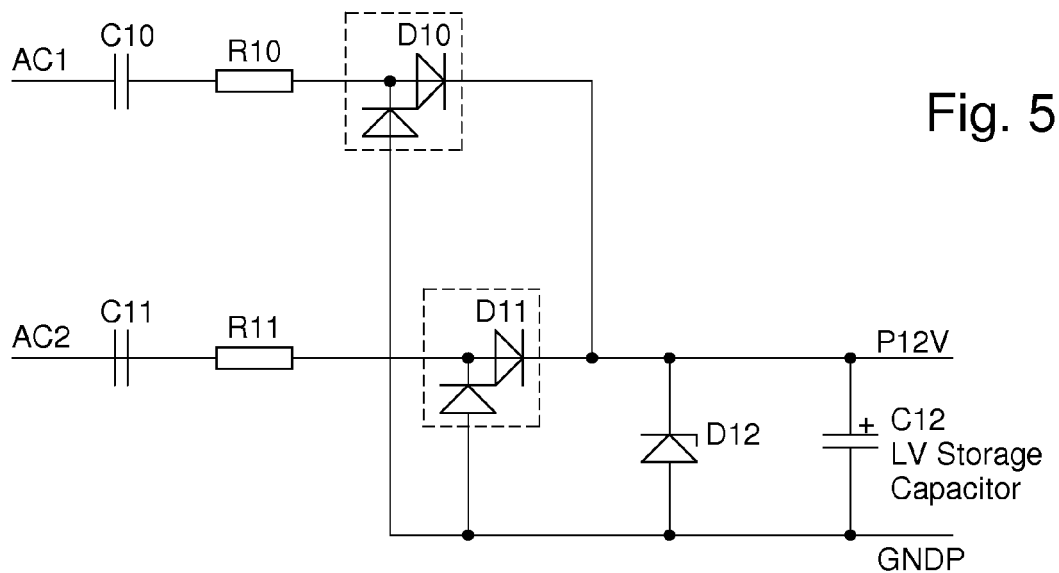
FIG. 5 shows the preferred design of the first voltage reducer circuit of the power supply unit of FIG. 3.

A preferred electronic circuit of the First Voltage Reducer is shown on FIG. 5.

The task of the first voltage reducer is to provide an intermediate voltage of about 12 to 13 V for the primary circuit part. This voltage level is required for the DC/DC control unit of the primary part of the DC/DC converter (and also for the optional PFC controller) and for the Second Voltage Reducer. A LV Storage Capacitor stores electrical energy at said intermediate voltage. It is to be noted that the LV Storage Capacitor could be also named "Intermediate Voltage Capacitor" because the voltage applied to this capacitor is the Intermediate Voltage 12-13 V.

The power supply controller however requires a low voltage (e.g. about 3.3 V) which is generated out of the 12-13 V by a Second Voltage Reducer.

Some possible types of low current zener diodes that are suitable for circuit element D12 (~13 V) include the ON Semiconductor MMSZ4700T1 and the Vishay TLZ13B.

The Diodes D10/D11 can be low voltage/low cost type, e.g. double-diodes BAV99. C10/C11 are normal film capacitors (MKT), e.g. 10 nF/630 VDC (ceramics are also possible). R10/R11 are necessary to limit the current in case of higher levels of input voltage harmonics (non-sinusoidal shape) or if line transients occur. Possible value: 100 R . . . 1 k.

The first voltage reducer, formed by a circuit having only two double-diodes and a zener diode with entry resistors and capacitors implements two functions: It forms a bridge rectifier together with a capacitive divider. In particular, a double-diode is involved both functions. This efficient arrangement is a key element for maintaining the electrical consumption of the power unit in the "power down" mode at a very low level. The Line input (active) power of this voltage reducer is about 3 milliwatt (mW) at 230 VAC.

The low voltage storage capacitor (LV Storage Capacitor) needs a certain minimum value to store enough energy for start up the primary DC/DC converter until the reverse supply provided by the converter secondary side is functioning. The value of such a capacitor is e.g. 47 µF (min. 25 V).

Figure 6:
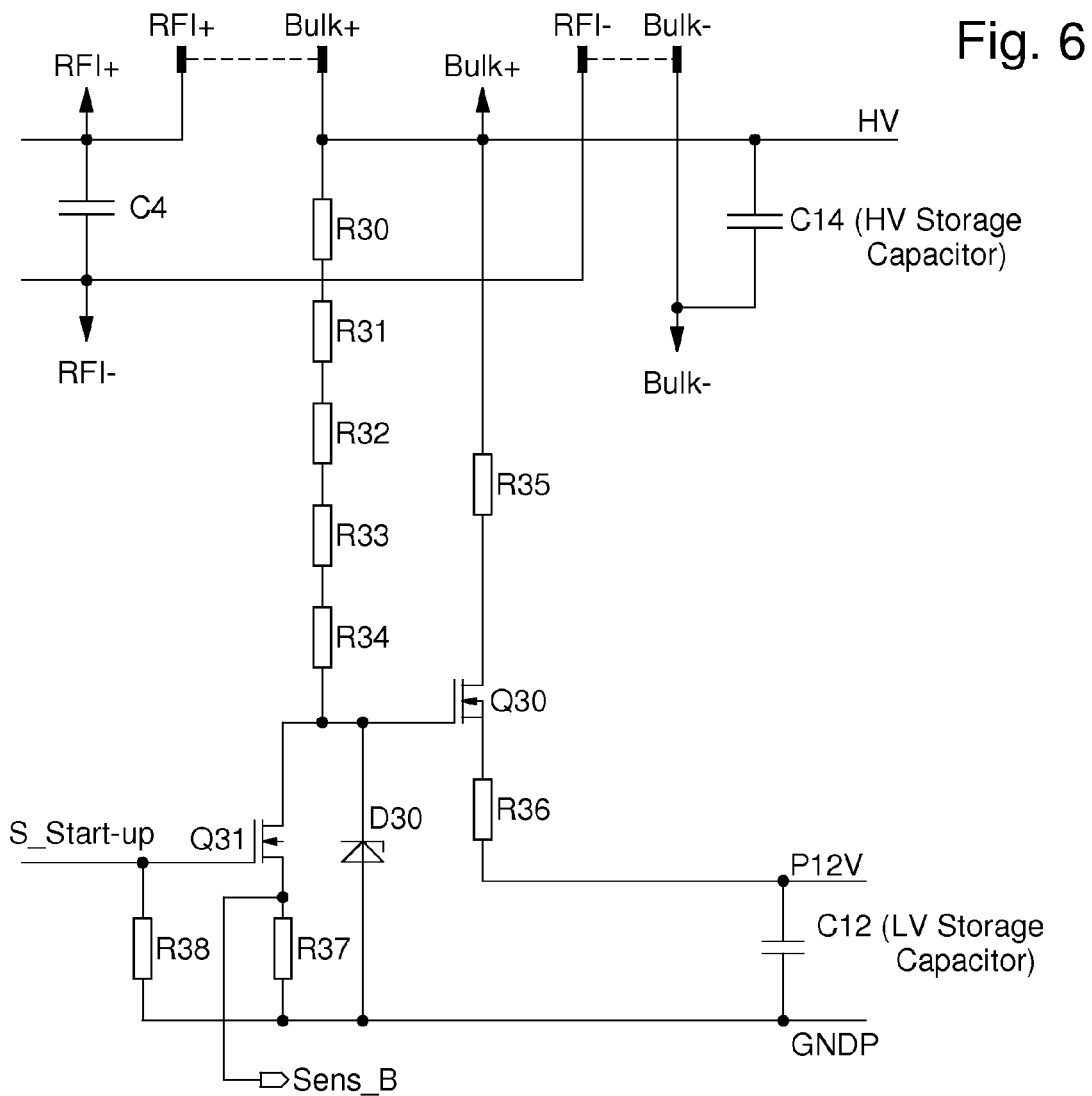
FIG. 6 shows the electronic circuit forming the start-up supply and discharge unit of the power supply unit of FIG. 3.

A preferred electronic circuit for the Start-up Supply/HV Discharge block is shown on FIG. 6.

This circuit part has two main functions:
  Acceleration of initial start up (charge "LV storage capacitor" with a higher current than the electrical current provided by the first voltage reducer);
  Discharge of the HV Storage Capacitor after the Input Voltage has been disconnected or after a pre-determined period of time has expired; and an additional auxiliary function:
  Providing a voltage divider to measure the "Bulk+" voltage (only if Q30 is disabled).

Possible dimensioning of R30 . . . R34: 5×10 MOhm. This gives continuous losses (totally R30 . . . R34) at 230 VAC of about 2 mW (current ~6 µA).

Some possible types of zener diodes for element D30 (~20 V, low current) include ON Semiconductor MMSZ470T1 and Vishay TZMC20. Some possible types of transistors for element Q30 (Voltage capability min. 400 V) include Infineon BSS127 and NXP PMBTA44. The transistor Q31 sees only max. 25 V, therefore a low cost MOSFET N-channel like 2N7002 or BSS123 can be used.

When the mains supply is interrupted a charge remains on the HV storage capacitor C14. Since quiescent currents are small the charge on this capacitor remains for a long time. Under the control of the power supply controller the capacitor C14 is then discharged according to system specifications. Transistors Q30 and Q31 are used to discharge the HV storage capacitor when the supply of the power unit is interrupted. The remaining charge on C14 (High Voltage Storage Capacitor) is being disposed of through the resistors R35, R36, the transistor Q30 and the zener diode D12 After power-down (that means cutting utility power), the charge of C14 continues to supply the second voltage reducer, thereby providing the energy for the power supply controller to continue to operate. The power supply controller sets the S_Startup signal low (thereby turning transistor Q30 on) for brief intervals to maintain the voltage at P12V at a sufficient level for the second power reducer. Once the power supply controller decides that any remaining charge stored in C14 needs to be neutralized, it disables the S_Start-up signal and thus switches Q31 OFF and Q30 back ON long enough to activate the zener diode D12 (in reverse direction) and discharge C14. The reverse breakdown voltage of this zener diode is e.g. 16 V (above the voltage level of the output of the first voltage reducer). This will eventually de-energize the second voltage reducer and the power supply controller itself. In the example of white goods equipment the system must in general be able to restart from the previous state after an interruption of 20 minutes. This period of time needs to be bridged. The circuit of this invention does provide this capability and will therefore not loose key system information and parameters. C14 will be able to hold the charge even much longer than needed and consequently needs to be discharged after a given period of time to avoid dangerous voltage levels during service access.

During the start-up phase of the power supply unit, the start-up circuit (shown on FIG. 6) controlled by the power supply controller providing a control signal (S_Start-up), allows to speed up the start-up phase. The capacitive divider stage shown on FIG. 5 (First Voltage Reducer) is specifically designed to a very low current circuit. On its own it would introduce a significant delay from plug-in of the main to the start-up of the power supply system (up to 10 seconds). The start-up circuit forms a parallel path to the First Voltage Reducer for fast charging the LV Storage Capacitor C12 and thus to speed up the start-up phase (In the case of the present described implementation by a factor of about 20, therefore reducing start up delays to about 500 ms).

On plug-in of the mains the signal "S_Start-up" is low (Q31 is OFF, Q30 is ON i.e. conducting). Capacitor C12 is rapidly charged through R35 and R36. The power supply controller starts as a consequence. It then sets the signal "S_Start-up" high (Q31 ON, Q30 OFF) and capacitor C12 is now supplied through the capacitive divider.

Transistor Q31 combined with resistors R30 to R34 and R37 are used to measure the primary voltage allowing the power supply controller to react to interruptions of the main supply. Once Q31 is ON, Signal "Sense_B" measures the divided down input voltage and feeds it to an AD converter on the power supply controller. In case of mains interruption the power supply controller will detect this situation fast enough to be able to stop the power section. In addition it prevents discharging of capacitor C14 for a given length of time to preserve system status.

It should be noted that the charge and discharge functions could be implemented in separate circuits instead of the combined circuit described above. In addition, the discharge circuit also replaces the parallel resistor in the Input Circuit. However such a parallel resistor could also be replaced by a further transistor controlled by the power supply controller.

Figure 7:
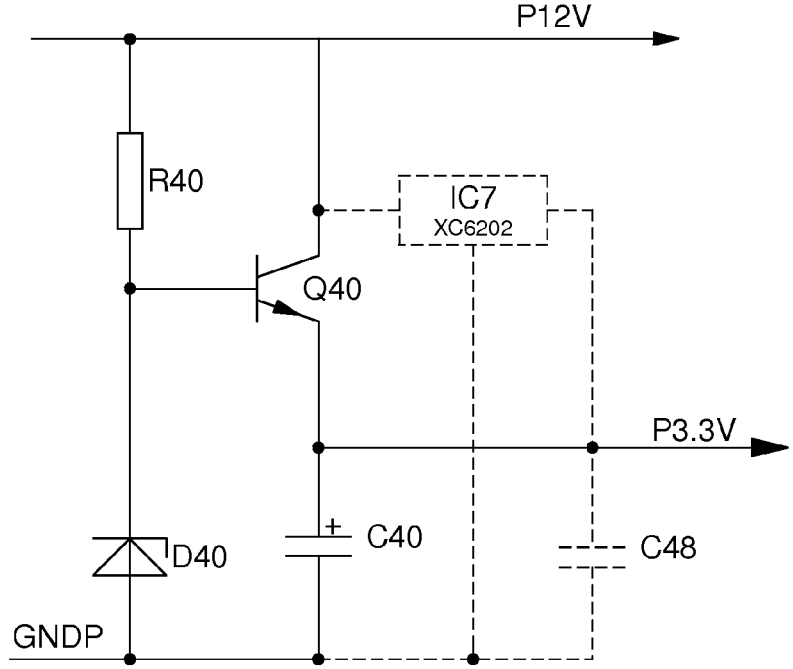
FIG. 7 shows the preferred design of the second voltage reducer circuit of the power supply unit of FIG. 3.

The preferred electronic circuit of the Second Voltage Reducer is shown on FIG. 7.

The power supply controller and also the IR Receiver module need for example a supply voltage in the range of 3.3 V. This voltage should be obtained out of the intermediate voltage (e.g. between 10 V and 15 V). A normal linear regulator has a too high quiescence supply current. Thus, according to a particular feature of the invention, the second voltage reducer has an electronic design with a low current zener diode D40, a resistor R40 arranged in series with D40 and, in parallel to these two elements, a transistor Q40 arranged in series with a capacitor C40 providing the reduced voltage 3.3 V. The base of transistor Q40 is connected between R40 and D40. A possible type of zener diode for the element D40 (3.6 V, low current) includes the ON Semiconductor MMSZ4885T1.

In an improved variant, it is possible to add a very low quiescence current linear regulator at 3.3 V (IC7) to further reduce the current consumption.

B) Power Supply Controller

According to a particular feature of the invention, a Power Supply Controller is implemented into the primary part (primary side) of the power supply unit according to the invention. In a first variant, this Power Supply Controller is formed by a dedicated State Machine. In another variant, the Power Supply Controller is formed by a programmable circuit. Preferably, the state machine and the programmable circuit have a low power design.

The tasks of the power supply controller include, but are not limited to:
Control of start-up supply
Measurement of analogue values:
  Supply voltage (Intermediate Voltage)
  Voltage at HV storage capacitor (Bulk+)
Wake up from "power-down mode" in case of
  Infra-red remote control "power on" received, and/or
  Pressed push button "Power",
  Programmable timer expired
Change to "power-down mode" in case of
  Infra-red remote control "power off" received and/or
  Pressed push button "Power" (e.g. short activation), and/or
  Command from main controller (e.g. after end of programmed recording)
Enable/disable DC/DC converter primary, depending on
  Supply voltage (Intermediate Voltage)
  Voltage at HV storage capacitor
  Temperature (µC internal measurement)
  Minimum off-time after overload-restart
Provide PWM signal (frequency and duty cycle) for DC/DC control primary, in particular:
  Provide soft start (duty cycle ramping up)
  Define maximum duty cycle (e.g. depending on Input Voltage)
  Eventually uttering of frequency (to optimize EMI)
  Provide "Burst-Mode" operation during conventional "Stand-by" mode
Receiving and decoding signal from IR receiver module
Cyclic re-powering of IR receiver module during "power-down" mode
Provide RTC (real time clock), including "wake-up timer" (loaded from main controller)
Receive data from main controller:
  Control flags (e.g. "on/off", "enable manual off", "wake-up acknowledge", "stand-by")
  Set RTC
  Load wake-up timer
Transmit data to main controller
  Status flags
  IR received data
  Read back settings of RTC/wake-up timer
Control of optional PFC.

Overview port Inputs/Outputs of the Power Supply Controller:

| No. | Type | Name | Description |
| --- | --- | --- | --- |
| 1 | Analog-In | S_P12V | Sense voltage P12V |
| 2 | Analog-In | S_Bulk+ | Sense voltage Bulk+ |
| 3 | Digital-Out | S_Start-up | Switch OFF/ON start-up supply |
| 4 | Digital-Out | S_CPP | Switch on supply voltage for DC/DC-converter |
| 5 | PWM-Out | S_PWM | Frequency and max. duty cycle for DC/DC-converter |
| 6 | Digital-Out | IR_Vcc | Supply voltage for IR receiver module |
| 7 | Digital-In | IR_Data | Data from IR receiver module |
| 8 | Digital-In | Pwr_Sw | Power switch pressed |
| 9 | Digital-In | Sclk | SPI clock input (if SPI-slave/otherwise "Digital-Out") |
| 10 | Digital-Out | Sout | SPI serial data out |
| 11 | Digital-In | Sin | SPI serial data in |

| No. | Type | Name | Description |
| --- | --- | --- | --- |
| 12 | Analog-In | S_VAC | Sense rectified AC-input voltage |
| 13 | Digital-Out | PFC_on | Enable PFC |
| 14 | Ref-Out | Vref | Band Gap Reference voltage |

C) IR-Receiver

A receiver module (preferably of low power type) for infrared (IR) remote control can be used as input of the Power Supply Controller. This is a possible sensor device to wake up from "power-down" mode. In a variant, this receiver module could be the only one of the Set Top Box and be used to receive all commands. In this case the IR receives data which must be transmitted to the main controller.

Figure 8:
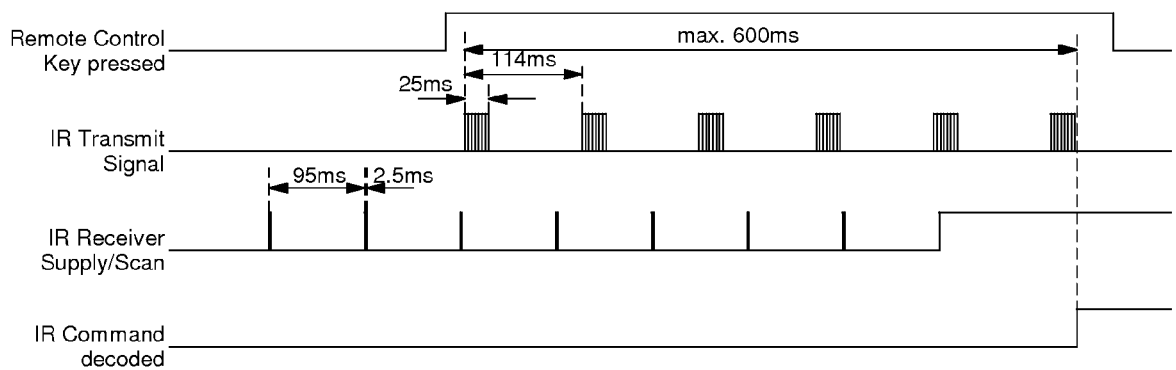
FIG. 8 shows a timing diagram of the power supply of an IR-Receiver in the power down mode of the power supply unit of FIG. 3.

During "power-down" mode the IR receiver should preferably be powered only during short time intervals to keep the average power as low as possible. On the other hand a received command should be detected within a certain maximum time. FIG. 8 shows a possible timing diagram if the common "RC-5-code" is used.

The duty cycle of powering the IR receiver would be 2.6% during "power-down" mode. Assuming a supply current of 1.3 mA (typ. value of Vishay TSOP 34838SS1A) this results in an average current of 34 µA. Alternative IR receivers (e.g. Sharp GP1US301XP) can be even below that value.

During "Active mode" the IR receiver will be preferably powered continuously, enabling the receipt of all commands without any delay.

D) Data Transfer Between Primary Side and Secondary Side

A bi-directional insulated interface between the primary side and the secondary side is arranged in the present embodiment for data transfer between the power supply controller located on the primary side and at least a main controller of the STB device located on the secondary side.

Figure 9:
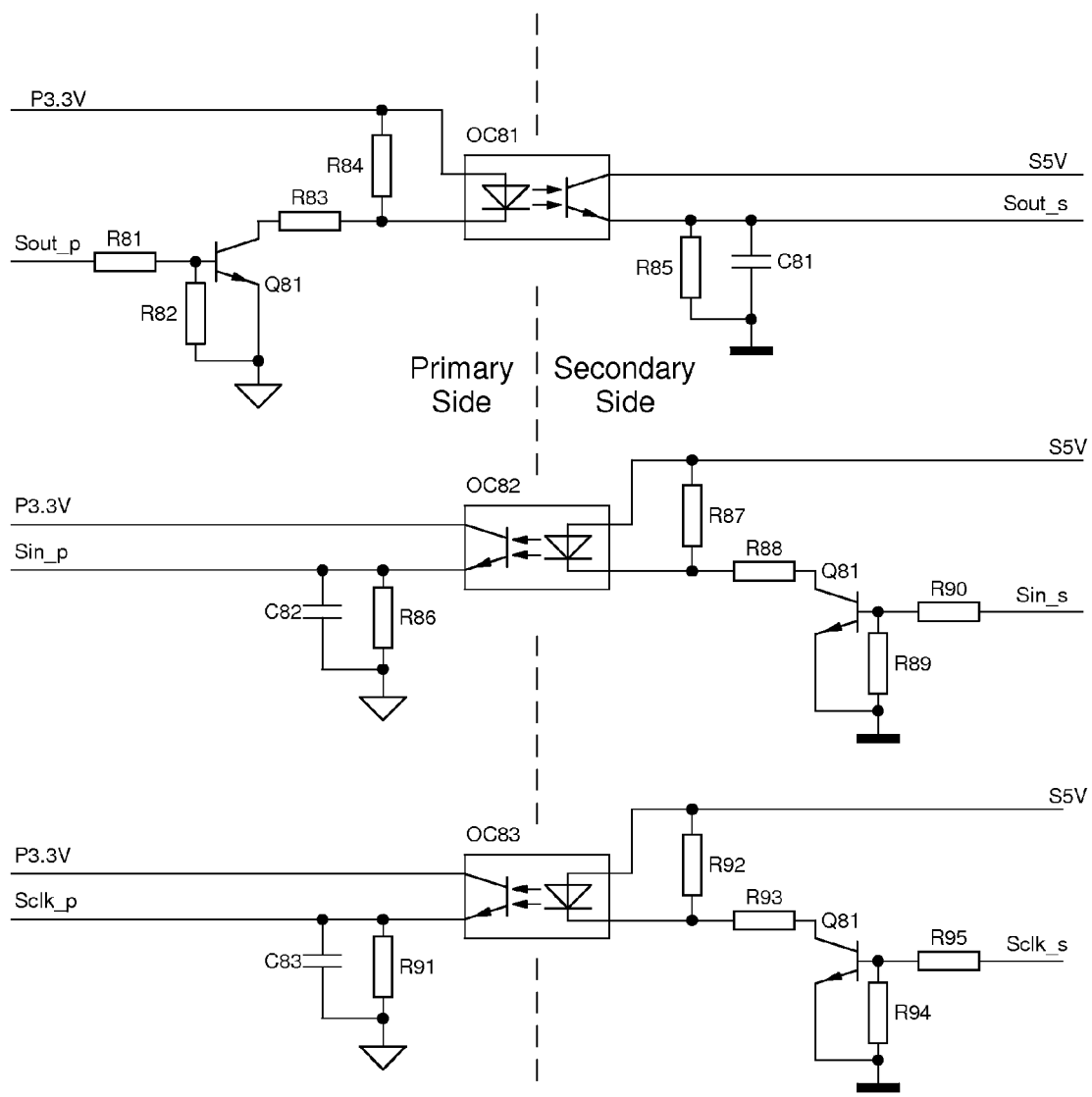
FIG. 9 shows a data transfer circuit between the primary and secondary parts of the power supply unit of FIG. 3.

The cost effective way for insulated data transfer is usually via opto-couplers (OC81, OC82, OC83). A proposed variant for implementing this insulated data transfer is shown on FIG. 9. The references Sout_p, Sin_p and Sclk_p respectively define the signal Sout, Sin and Sclk on the primary side. The references Sout_s, Sin_s and Sclk_s respectively define these signals on the secondary side.

If the data clock rate is not too high (range 1 kHz or below), then cheap opto-coupler type like LTV817S or PC817 can be used.

E) DC/DC Converter Primary Part

Figure 10:
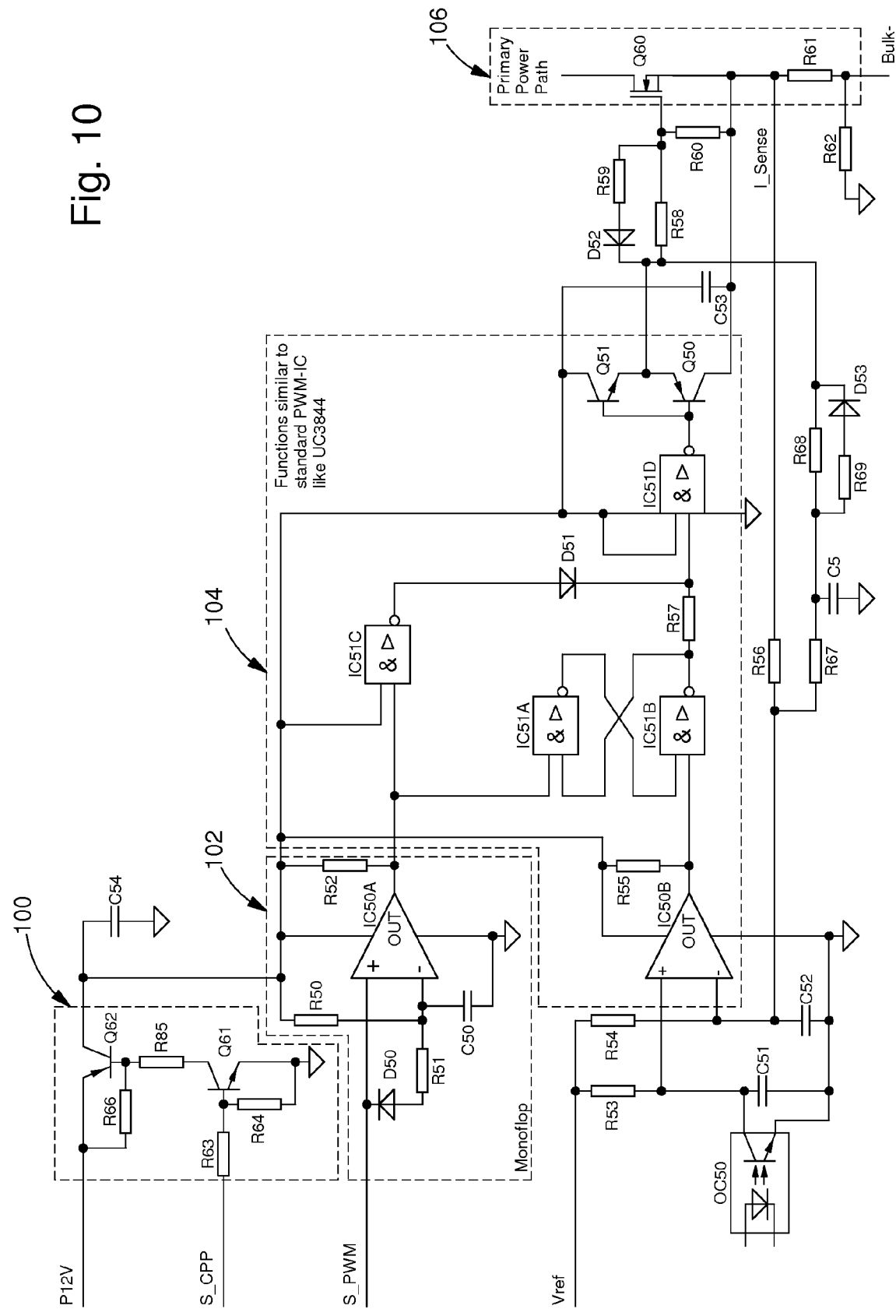
FIG. 10 shows the design of an electronic control circuit associated with the primary part of the DC-DC converter of the power supply unit of FIG. 3.

The control unit of the primary part is shown on FIG. 10. This control circuit has a first part 100 receiving the power signal at 12 Volt generated by the first voltage reducer and a switching signal (S_CPP) received from the power supply controller. This switching signal is used to turn ON or OFF the primary part of the DC-DC converter. S_CPP enables and disables the amplifier element in part 102 and IC51C, IC51D and transistor pair Q50/51 in part 104. Part 100 is a specific object in this invention in that it permits the complete shut down of the converter primary and secondary parts during the power-down mode of the system. The power line outputting the first part 100 is connected to a monoflop circuit 102 which also receives in entry a PWM Signal (S_PWM). This PWM signal is used to modulate the current flowing through the DC-DC converter at least in certain functioning modes. The power line and the output of the comparator of the monoflop circuit enter the circuit part 104 which emulates the function of a usual current mode PWM controller (like e.g. UC3844). In this embodiment the following functions are taken over by the power supply controller:

Oscillator, including max. duty cycle definition and soft-start

"Burst-mode" operation during conventional "stand-by mode" (can reduce stand-by input power)

Switching of 12 V supply voltage

Supervision of supply voltage including over-voltage-protection

Defined cycling to restart in case of output overload

Reference voltage source

The remaining circuit 104 can be realized with standard-ICs, like LM393+CD4011 (less material cost than UC3844).

A voltage control loop is implemented receiving the secondary side signals from element "control loop to primary" (FIG. 12) and transmitting them through an isolating opto-coupler OC50 to the comparator element IC50B.

In a variant of this system the PWM output of the power supply controller drives the switching transistor directly (with a gate drive circuit between). As a consequence of the (relative fast) voltage and current control loop is realized in firmware. The circuit part 102 ("Monoflop") is provided for safety reason: if the PWM output of the power supply controller is staying at high level (in case of malfunction), then this part protects the power stage against damage. A spare comparator (like the type LM393) can be used in the circuit part 102.

Figure 11:
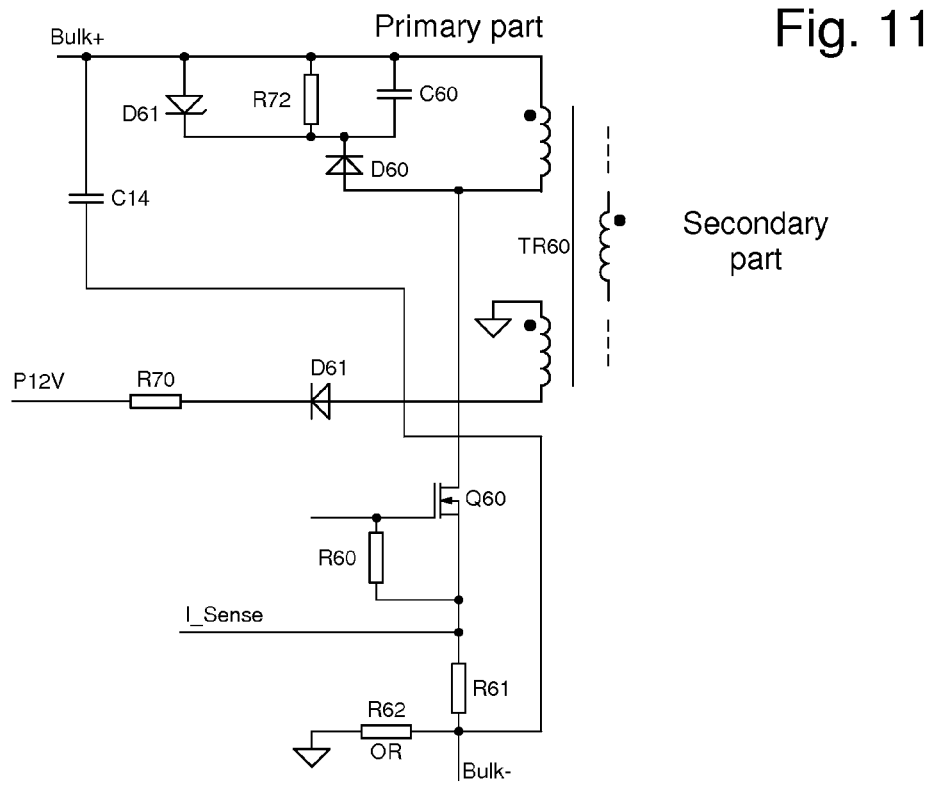
FIG. 11 shows a possible arrangement of the power part of the primary part of the power supply unit of FIG. 3.

Based on the different specific electronic circuits arranged on the primary part of the power supply unit of the particular embodiment described above, the following characteristics concerning its power consumption and efficiency are obtained:

Input power in "power-down" mode is around 10 mW or below (e.g. 4 to 5 mW);

Input power at "stand-by" mode<1 W (if output load is below 0.6 W) which corresponds to the actual "Energy Star" requirement;

Efficiency in active mode is minimum 80%. The power part of the primary part of the DC/DC Converter is represented on FIG. 11. The circuit is based on the flyback converter concept with backwards bias.

The requirements for MOSFET Q60 in the present embodiment include a min. voltage of 600 V (preferred>650 V), an internal resistance $R_{OS(on)}$ max. 4 Ohm (preferred<3 Ohm)

D60 is an "ultra fast recovery rectifier" diode with min. 800 V, 1 A, max. 100 ns, like type "US1K".

R61 is the current sense resistor. Its value is e.g. 1 R (1 W) or less. A feedback supply signal (12 V) is provided and used to power the second voltage reducer after the converter start-up phase has been completed.

F) DC/DC Converter Secondary Part

Figure 12:
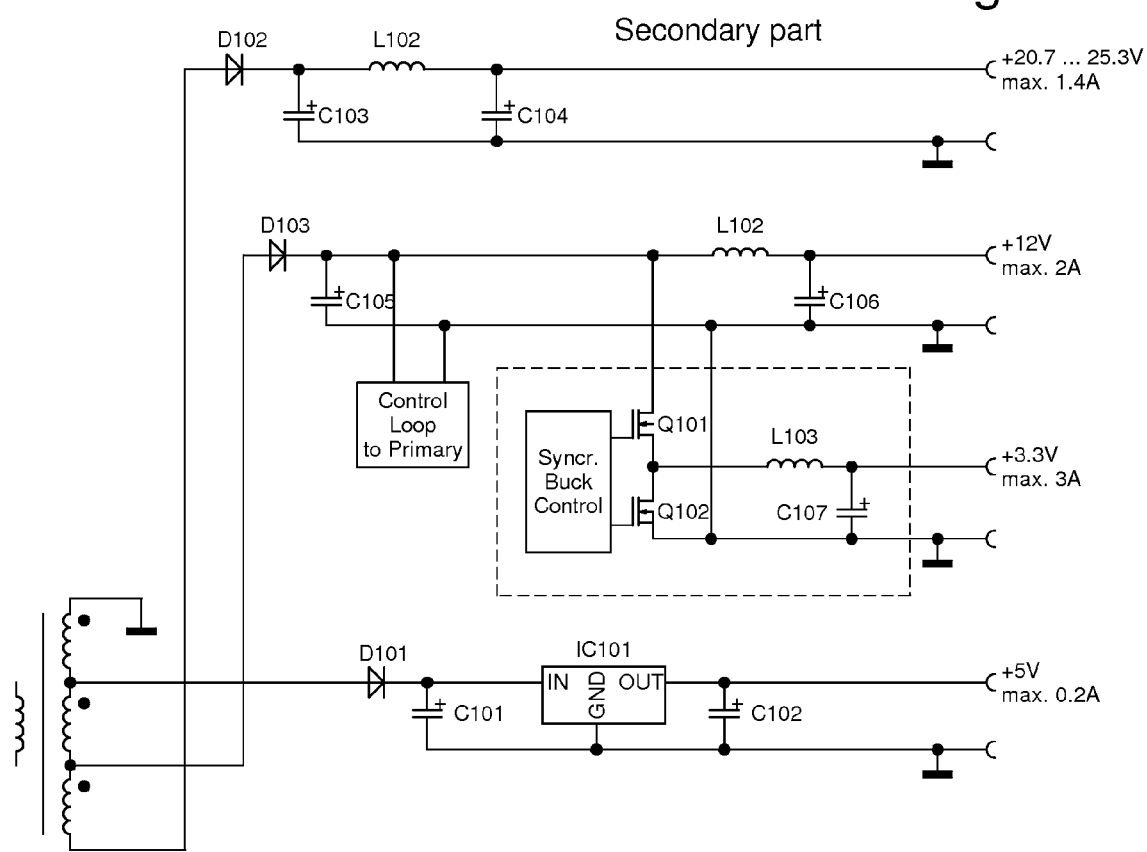
FIG. 12 schematically shows a possible arrangement of the secondary part of the power supply unit of FIG. 3.

The secondary power part of the DC/DC Converter is represented on FIG. 12.

If using only one converter for several different output voltages (here: four), the topology has to be determined. In general, without post-regulation it is only possible to control one of the outputs accurately. In this case, the accurate power output is the +12 V output (the +23 V is higher power, but allows more tolerance).

The main voltage control loop to the primary side is the output of the +12 V controller. The overload protection for this output (and +23 V output) is the primary side current limitation (which limits the total output power).

Low current outputs can be post-regulated by a (cheap) linear regulator. In this case this method can be used for the +5 V/0.2 A (e.g. with type 78M05). As an alternative a buck converter out of +12 V could be used (e.g. type NCP3063B from ON Semicond.), especially, if higher current is needed on the +5 V.

Requirements for D101: min. 60 V/min. 1 A ultra fast recovery or Schottky type (e.g. ES1B from Fairchild Semicond.). Requirements for D102: min. 150 V/min. 4 A ultra fast recovery or Schottky type (e.g. MBRF10H150CTG from ON Semicond.). Requirements for D103: min. 80 V and min. 6 A Schottky type rectifier (e.g. FYP1010DN from Fairchild Semicond.).

There might be snubber components (R/C) necessary across D102 and D103, depending on converters leakage inductance. L101/L102 are proposed to reduce the output ripple and noise; they also can help to improve the EMI behaviour. Value: e.g. 10 µH/3.5 A (e.g. type RFB0810-100L from Coilcraft).

All electrolytic capacitors should be "low impedance" type (e.g. KZ Series from CapXon): C105 and C106 e.g. 2200 µF/16 V; C107 e.g. 1200 µF/16V; C103 and C104 e.g. 1000 µF/35 V.

The 3.3 V output can be post-regulated out of +12 V with a synchronous buck converter. This reduces the converter's complexity and cost. Additionally the efficiency will be improved.

In case of no internal MOSFETs, they have to be provided externally. Requirements: min. 30 V, max. 30 mR, e.g. types FDS8984 (Fairchild Semiconductor)/NTMD6N02R2 (ON Semiconductor)/STS8DNF3LL (STMicroelectronics). All these types are double MOSFETs, meaning two transistors in one package.

The inductance of L103 is depending on the switching frequency and the required output ripple voltage (and the impedance of C107 at that frequency). Typical value can be 10 µH/3.5 A (e.g. type RFB0810-100L from Coilcraft).

G) Modifications for Other Applications

This power supply unit or system according to the invention is also usable for various other applications, e.g. for a DVD-Player and a "Flat-TV".

If the power level is the same (50 W), then only the secondary side (including the converter) of the above described embodiment has to be adapted. Also the serial communication to a secondary controller may be modified. If no real time clock is needed, then the data transmission can eventually be only unidirectional.

If the power level is different, then the primary power stages have to be adapted also. Above 75 W input power (about 60 W output power), a power factor correction unit (PFC) has to be introduced.

H) Summary of Some Main Benefits/Advantages of the Invention

A power supply unit, as proposed in this description, will have the following main benefits/advantages over current embodiments:
- Substantially lower energy consumption in "power-down" mode (in particular less than 10 mW)
- Fulfilment of current and future standards for "green power" requirements (i.e. "Energy Star"/"Blue Angel")
  Substantially below these limits in "power-down" mode
  Below limits in "stand-by" mode
- During "power-down" mode maintaining restart possibilities to normal operation, triggered by
  Infra-red (IR) remote control, or
  Push button, accessible from front side, or
  Programmable timer (internal real time clock)
- No need of a battery or "Supercap/Goldcap" in the device or installation on the secondary side (in particular for the real time clock)

The concept is easy adaptable to many applications.

What is claimed is:

1. Electrical installation or device equipped with a power supply unit comprising a voltage converter having primary and secondary parts respectively defining a primary side and a secondary side of this electrical installation or device, this power supply unit also comprising on said primary side:
an input circuit including a main rectifier;
a control circuit of the primary part of the converter which controls the electrical energy flowing in the primary power path of this primary part;
receiving means of at least an external control signal which provides at its output, in response to this external control signal, a wake-up signal for waking up the electrical installation or device from a very low power mode or generating means of such a wake-up signal;
a power supply controller arranged for receiving said wake-up signal and for providing to said control circuit at least a first control signal for switching OFF the electrical energy in said primary power path when the electrical installation or device enters said very low power mode, so that the secondary part of the converter is not supplied anymore, and for switching ON the electrical energy in said primary power path when it receives from said receiving means or generating means said wake-up signal;
primary supply voltages generation means arranged for supplying said control circuit, said receiving means or generating means and said power supply controller, said primary supply voltages generation means comprising a first voltage reducer or a first output of a voltage reducer unit supplying in parallel the control circuit and a part of the power supply unit comprising the receiving means or generating means and the power supply controller, said first voltage reducer being arranged for receiving an alternative power signal from an electrical supply source supplying the electrical installation or device and being formed by a capacitive divider, this first voltage reducer being associated to a dedicated rectifier which charges an intermediate voltage capacitor for supplying in parallel said control circuit and said part of the power supply unit.

2. Electrical installation or device according to claim 1, wherein said first voltage reducer is formed by a circuit having only two double-diodes, one zener diode, capacitor(s) and entry resistor(s) for limiting the current in case of high level input voltage harmonics or if line transients occur.

3. Electrical installation or device according to claim 1, wherein, during said very low power mode, said control circuit of the primary part of the converter is shut down.

4. Electrical installation or device according to claim 3, wherein said control circuit comprises a switching circuit for turning OFF or ON the supply of this control circuit in order to respectively switch OFF or ON the energy supply in said primary part of the controller.

5. Electrical installation or device according to claim 1, wherein, during said very low power mode, said receiving means is powered only during short time intervals to keep the average power for its functioning as low as possible.

6. Electrical installation or device according to claim 1, wherein said power supply controller manages several functions of the power supply unit.

7. Electrical installation or device according to claim 1, wherein said power supply unit comprises a second voltage reducer, following said first voltage reducer, or a second output of the voltage reducer unit providing a low voltage for supplying said power supply controller and said receiving means or generating means.

8. Electrical installation or device according to claim 7, wherein said second voltage reducer is formed by a circuit having a low current zener diode, a resistor arranged in series with the zener diode and, in parallel to these two elements, a transistor arranged in series with a capacitor providing the low voltage, the base of the transistor being connected between the resistor and the zener diode.

9. Electrical installation or device according to claim 7, wherein said power supply controller and said receiving means or generating means are supplied in parallel by said second voltage reducer.

10. Electrical installation or device according to claim 1, wherein said receiving means defines an external control interface, a sensor, a receiver and/or a switch arranged on said primary side for receiving at least said first external control signal.

11. Electrical installation or device according to claim 1, wherein said generating means of said wake-up signal is associated with a time base, this time base being active in said very low power mode, said power supply controller being arranged for measuring a determined time period after which said wake-up signal is generated.

12. Electrical installation or device according to claim 1, wherein said power supply controller is arranged for providing a second control signal to said control circuit of said primary part of the voltage converter, this second control signal defining a PWM signal for regulating the electrical current flowing through said primary power path in at least a functioning mode other than said very low power mode and thus regulating the electrical power supplied to said secondary side of the electrical installation or device.

13. Electrical installation or device according to claim 1, wherein said power supply unit further comprises a start-up supply circuit arranged between said primary power path and said intermediate voltage capacitor, this start-up supply circuit being arranged to accelerate an initial charge of the intermediate voltage capacitor in a start-up mode wherein the primary part of the voltage converter is started up by this intermediate voltage capacitor.

14. Electrical installation or device according to claim 1, wherein said power supply unit further comprises a discharge circuit for discharging, at least after a certain delay following an interruption of the supply of the electrical installation or device by said electrical supply source, a high voltage storage capacitor arranged after a main rectifier of this power supply unit in parallel to said primary power path.

15. Electrical installation or device according to claim 13, wherein said start-up supply circuit and said discharge circuit are both formed by a same electronic circuit block.

16. Electrical installation or device according to claim 1, wherein a bi-directional insulated interface is arranged between the primary side and the secondary side for data transfer between said power supply controller located on the primary side and at least a main controller located on the secondary side.

17. Electrical installation or device according to claim 1, wherein said input circuit has at least a first capacitor on the AC side and at least a second capacitor on the DC side of said main rectifier, said first capacitor having a maximum value selected so that no parallel resistor is needed within said Input Circuit.

18. Electrical installation or device according to claim 1, wherein said power supply unit further comprises a power factor controller arranged on said primary power path, and wherein said power supply controller also controls this power factor controller at least for enabling it when needed.

19. Electrical installation or device according to claim 18, wherein the power factor controller is supplied by said first voltage converter.

20. Electrical installation or device according to claim 1, wherein it is arranged for keeping the current state of this electrical installation or device in said power supply controller, when the electrical supply source is cut OFF, without any additional battery or big capacitor.

* * * * *